Jan. 17, 1961  J. D. YANDA  2,968,378
ELECTRICALLY CONTROLLED AUTOMATIC HAND BRAKE RELEASE
Filed March 5, 1957  2 Sheets-Sheet 1
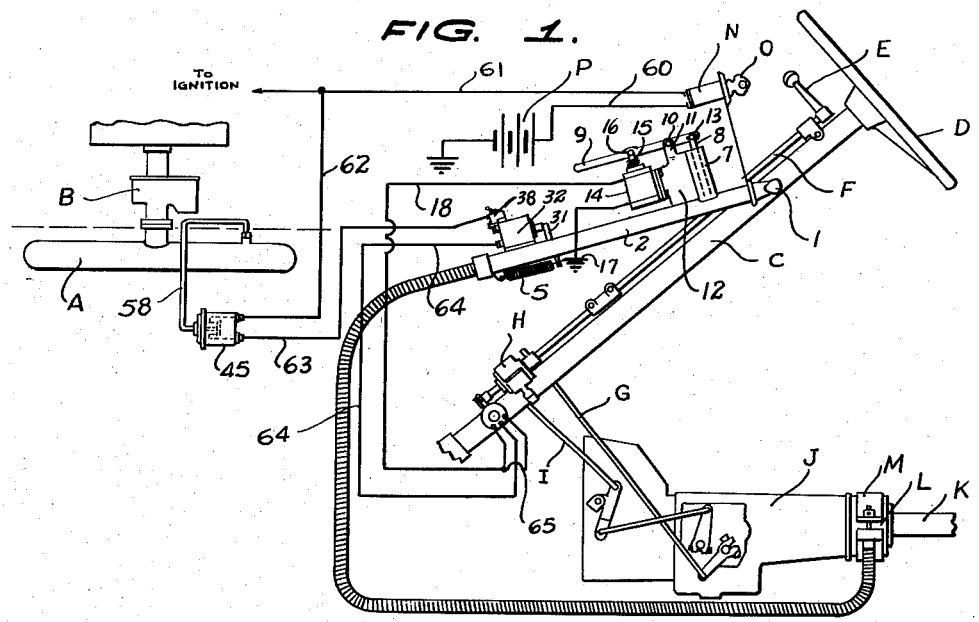
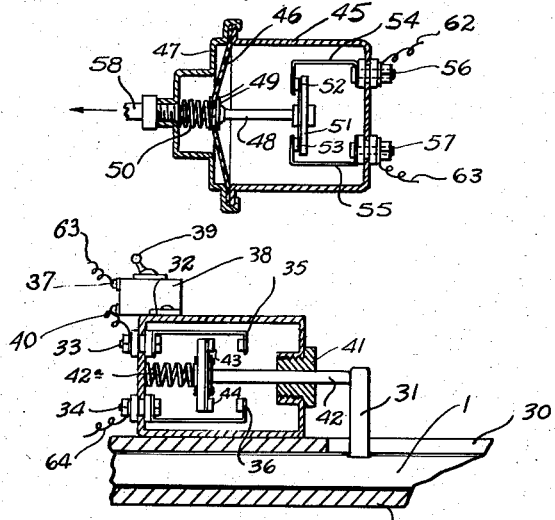
INVENTOR.
JOHN D. YANDA,
BY
ATTORNEYS.

Jan. 17, 1961 J. D. YANDA 2,968,378
ELECTRICALLY CONTROLLED AUTOMATIC HAND BRAKE RELEASE
Filed March 5, 1957 2 Sheets-Sheet 2

INVENTOR.
JOHN D. YANDA,
BY
*Linton and Linton*
ATTORNEYS.

UnitedStatesPatentOffice 2,968,378
Patented Jan. 17, 1961

2,968,378

ELECTRICALLY CONTROLLED AUTOMATIC HAND BRAKE RELEASE

John D. Yanda, Maple Lane, Bethlehem, Wheeling, W. Va.

Filed Mar. 5, 1957, Ser. No. 644,098

2 Claims. (Cl. 192—4)

The present invention is concerned with parking brakes for retaining a vehicle from movement for extended periods and is more particularly concerned with means for releasing such brakes when it is desired to move the vehicle.

The principal object of the present invention is to provide a means for releasing the parking brake of vehicles at the will of the operator and through the operation of electrical elements.

A further and important object of the invention is to provide means for releasing the vehicle parking brake through an electrical circuit closing member readily accessible to the operator of the vehicle and which means can be manually operated whenever necessary. However the brakes will not be automatically released if the vehicle gear shift selector is in a neutral position and will only be released when the selector is moved for placing the transmission into gear and the electrical ignition circuit of the vehicle is completed.

An equally important object of the invention is to provide means for automatically releasing the parking brake upon activating the starting mechanism of the vehicle engine.

Further objects of the invention can be readily extended from and will be particularly pointed out from the following description of the accompanying drawing wherein, Fig. 1 is a diagrammatic view of the present brake releasing means interconnected with conventional vehicle elements.

Fig. 2 is an enlarged cross sectional view of a vacuum operated electrical circuit maker and breaker forming part of the present means.

Fig. 3 is an enlarged cross sectional view of a rotary gear selector operated electrical switch.

Fig. 4 is an enlarged cross sectional view of a brake handle shaft controlled electrical circuit make and break device.

Figure 5:
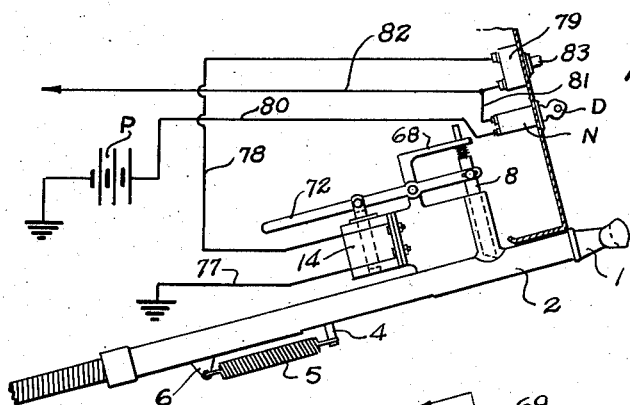
Fig. 5 is a diagrammatic view of a modified form of an automatic brake release.

In Fig. 1 there is disclosed conventional elements of a vehicle to be propelled by an internal combustion engine and which includes the intake manifold A of the engine with carburetor B mounted thereon, a steering column C with steering wheel D and a gear shift selector E fixedly connected to control rod F which is longitudinally slidable and pivotally mounted on column C. A link G is pivotally connected to said shaft while a toggle member H connects said shaft to a link I with both links G and I being pivotally connected to the control members of the engine transmission J which may be of the automatic; semi-automatic; or manually controlled type. A drive shaft K is connected to said transmission and has a brake drum L fixedly mounted thereon with a split brake band M surrounding said drum. The aforementioned elements of the vehicle are shown by way of example only and other and known like elements may equally as well be used with the present brake releasing means. The brake releasing means forming the present invention consists of a shaft 1 longitudinally slidable within a housing 2 which housing has a slot 3 through which extends a finger 4 connected to said shaft and to spring 5. Shaft 1 is connected by a cable to brake M. The other end of said spring is connected to a second finger 6 mounted on said housing. A tubular extension 7 extends laterally of said housing and has a pawl 8 slidably mounted therein for engaging one of a series of teeth 9 formed in said shaft.

A lever 9a is pivotally connected at 10 to an arm 11 of said extension 7 with a plate 12 also mounted on said casing. Said lever 9 is further pivotally connected at 13 to pawl 8.

A solenoid 14 has a coil spring 15 surrounding the core 14a thereof which core is pivotally connected to lever 9 at 16. Said solenoid is grounded by a wire 17 connected to one terminal thereof while a wire 18 is connected to the other terminal.

As best shown in Fig. 3 of the drawings, there is mounted on column C a pivotal circuit maker and breaker operable by the gear selector rod F. This circuit consists of a housing 19 having the slot 20 and a stub axle 21 therein. A T-shaped lever 22 of electrical insulating material is pivotally mounted on said axle and extends through slot 20. Arm 22 has a slot 23 through which slidably extends a pin 24 carried by rod F. Contacts 25 and 26 carried by said T-shaped lever are in contact with an arm 27 of electrical conducting material. Contacts 28 and 29 are mounted in said housing but insulated therefrom and further positioned so that contacts 26 and 28 engage when lever F is moved to the left of Fig. 3 and contacts 25 and 29 engage when lever F is moved to the right of Fig. 3.

As shown in Fig. 4, housing 2 has a longitudinal slot 30 through which extends a finger 31 connected to shaft 1. A switch housing 32 is also mounted on housing 2 and has a pair of terminals 33 and 34 extending through and insulated from one end thereof. Electrical contact points 35 and 36 are electrically connected to said terminals 33 and 34 respectively.

A plug 41 is mounted through said housing with rod 42 of electrical insulating material slidably extending through said plug and carrying contact points 43 and 44, which are electrically connected, in the inner end thereof in such a manner that said points can contact points 35 and 36 respectively. When shaft 1 is released, spring 5 will move the same so that finger 31 will contact rod 42 and separate points 43 and 44 from points 35 and 36 as shown in Fig. 4. When said shaft is drawn outwardly setting the brakes, spring 42a will push the points 43 and 44 into contact with points 35 and 36.

Mounted upon switch 32 is a conventional toggle type electric circuit maker and breaker having a terminal 37 connected to wire 63 and generally represented by the reference character 38. The toggle 39 controls the making and breaking of this switch. The second terminal 40 thereof is electrically connected to the terminal 33 of switch 32.

A vacuum operated electrical circuit maker and breaker is best shown in Fig. 2 of the drawings and consists of an open end housing 45 having a flexible diaphragm 46 across said open end which diaphragm is retained thereon and encased by a cover 47. Rod 48 of electrical insulating material is connected to said diaphragm by flanges 49 while a coil spring 50 tends to push said diaphragm and rod to the right of Fig. 2. A laterally extending plate 51 of current conducting material is connected to the end of rod 48 and carries contact points 52 and 53. Connectors 54 and 55 are positioned for engaging said points 52 and 53 and are also connected to terminals 56 and 57 respectively which extend through and are insulated from housing 45. A tube 58 is connected with cover 47 and is in communication with the interior thereof. Said tube further is connected to manifold A of the vehicle engine.

In the operation of the present apparatus the electrical ignition switch N upon being turned on by a key O will conduct current from battery P through wire 60 to wire 61 to the ignition system of the engine. Wire 62 connected to wire 61 is also connected to terminal 56. The suction created in manifold A by the running engine will draw diaphragm 46 to the left of Fig. 2 compressing spring 50 and engaging points 52 and 53 with connectors 54 and 55 whereby the current from wire 62 will pass to wire 63 and terminal 33 of switch 32. When the parking brake is set by drawing shaft 1 to the right of Fig. 4 point 43 will contact point 35 and point 44 will engage point 36 passing current to terminal 34 and thus wire 64 to the member 27 of the switch shown in Fig. 3.

Upon movement of lever F to place the transmission J in either forward or reverse position current will be conducted from member 27 and from there to points 25 and 26 onto either point 28 or 29 depending upon the direction of movement of shaft F. In either event current will be passed to wire 18 directly or to wire 65 and from there to wire 18 so that the solenoid 14 will be energized drawing the core 14a inwardly raising pawl 7 releasing shaft 1 and the brake M. Thereupon finger 31 will engage shaft 42 breaking contact between points 43 and 44 and 35 and 36 breaking the circuit so that the solenoid 14 will release core 14a whereupon spring 15 will push pawl 7 against shaft 1. At any time that switch 32 is closed with points 35 and 36 in contact with points 43 and 44 the circuit thereto can be broken by operating toggle 39. Thus, the motor or the like can be worked upon while operating without releasing the brakes such as a mechanic when making repairs. However switch 38 is normally closed for conducting current from wire 63 to terminal 33.

Figure 6:
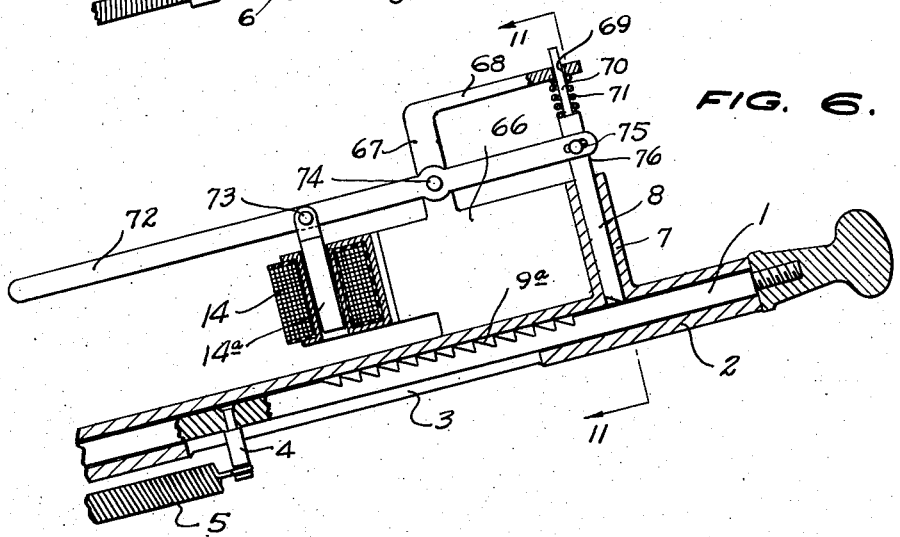
Fig. 6 is an enlarged cross sectional detail view of the operating members of the brake release of Fig. 5.
Figure 7:
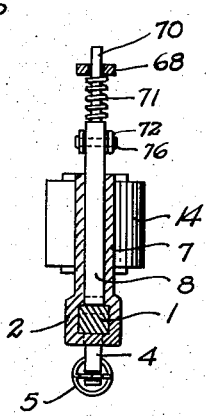
Fig. 7 is a cross sectional view taken on line 11—11 of Fig. 6.

In Figs. 5, 6 and 7 there is shown a modified form of automatic brake release. As best shown in Fig. 6 the members 1 to 9 inclusive are the same ash those described for the previous modification. In addition, a plate 66 is mounted on housing 2 for supporting solenoid 14 and also has an extension 67 with a lateral arm 68 having an opening 69 through which slides an extension 71 of pawl 8. A coil spring 71 surrounds said extension between pawl 8 and arm 68 tending to push the pawl towards shaft 1. A lever 72 has solenoid core 14a pivotally connected thereto at 73 and said lever is pivotally connected to extension 67 at 74. Also included is a conventional electrical ignition switch N connected to a battery P at one terminal by a wire 80 and having a wire 81 connected to the electrical ignition circuit of the engine by a wire 82 which is also connected to a terminal with a push button switch 79 whose other terminal is connected by a wire 78 to a terminal of solenoid 14 which in turn has its second terminal grounded by wire 77. Thus upon turning the ignition key O, the motor of the vehicle is started. When it is desired to release the parking brake, pushing button 83 closes switch 79 energizing solenoid 14 whose core 14a draws lever 72 downwardly raising pawl 8 and releasing shaft 1.

The present device is capable of considerable modification and such changes thereto as come within the scope of the appended claims are deemed to be a part of the present invention.

What I claim is:

1. An automatic brake releasing system for vehicles having an engine intake manifold, a gear shift selector, a parking brake and a switch operated electrical ignition system comprising a tube fixedly mounted on said vehicles having elongated slots therein and a side opening, a hand brake control rod operatively connected to said parking brake and being slideably mounted in said tube, said rod having a series of teeth positioned for movement beneath said tube side opening, fingers extending laterally of said rod through said tube slots, one of said fingers being resiliently connected to said tube drawing said rod to its brake releasing position, a solenoid operable pawl slideably positioned through said tube side opening for being withdrawn upon operation of said solenoid, resilient means tending to move said pawl for engaging said rod teeth retaining said rod in its braking position, an electrical switch mounted on said tube including a switch actuating plunger positioned in the path of the other of said finger for being moved to circuit opening position upon release of said rod, resilient means tending to return said plunger to circuit closing position, a vacuum operated electrical switch connected to said engine intake manifold for being closed upon operation of the engine, resilient means tending to retain said second switch open, an electrical circuit connecting the engine ignition system to said vacuum operated switch and said vacuum operated switch to said first mentioned switch, and means operable by said gear shift selector for electrically connecting said first switch to said solenoid only when said selector is moved to an in-gear position, the closing of said switches and the operation of said last-mentioned means thereby releasing said rod.

2. An automatic brake releasing system for vehicles as claimed in claim 1 wherein a plate is mounted laterally on said tube and has said solenoid connected thereto, an L-shaped arm is mounted on said plate and has an opening in the free end thereof, a lever is pivotally connected to said L-shaped arm, the solenoid core and said pawl, said pawl has a reduced end portion slideable through said L-shaped arm opening and a coil spring is positioned on said pawl reduced portion and bears against said L-shaped arm.

References Cited in the file of this patent

UNITED STATES PATENTS

| | | |
|---|---|---|
| 2,281,916 | Claytor | May 5, 1942 |
| 2,532,357 | Callender et al. | Dec. 5, 1950 |
| 2,751,054 | Del Re | June 19, 1956 |